US011287381B2

(12) United States Patent
Gu et al.

(10) Patent No.: US 11,287,381 B2
(45) Date of Patent: Mar. 29, 2022

(54) SYSTEM AND METHOD FOR MEASURING SUN-INDUCED CHLOROPHYLL FLUORESCENCE

(71) Applicant: UT-Battelle, LLC, Oak Ridge, TN (US)

(72) Inventors: Lianhong Gu, Oak Ridge, TN (US); Jeffrey S. Riggs, LaFollette, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 1251 days.

(21) Appl. No.: 15/638,473

(22) Filed: Jun. 30, 2017

(65) Prior Publication Data

US 2019/0003972 A1 Jan. 3, 2019

(51) Int. Cl.
*G01N 21/64* (2006.01)
*G01N 21/84* (2006.01)
*G01N 21/63* (2006.01)

(52) U.S. Cl.
CPC ... *G01N 21/6486* (2013.01); *G01N 2021/635* (2013.01); *G01N 2021/6417* (2013.01); *G01N 2021/6484* (2013.01); *G01N 2021/8466* (2013.01); *G01N 2201/0231* (2013.01); *G01N 2201/0238* (2013.01);
(Continued)

(58) Field of Classification Search
CPC ................................................ G01N 21/6486
See application file for complete search history.

(56) References Cited

U.S. PATENT DOCUMENTS

2004/0044639 A1† 3/2004 Schoenberg
2005/0248758 A1* 11/2005 Carron ................... G01N 21/65
356/301

OTHER PUBLICATIONS

MacArthur, A, Robinson, I, Rossini, M, Davis, N & MacDonald, K2014, A dual-field-of-view spectrometer system for reflectance and fluorescence measurements (Piccolo Doppio) and correction of etaloning, in Proceedings of the Fifth International Workshop on Remote Sensing of Vegetation Fluorescence. European Space Agenccy, Fifth International Workshop on Remote Sensing of Vegetation Fluorescence, Paris, United Kingdom, pp. 1-8 plus cover page, Apr. 22, 2014.

(Continued)

*Primary Examiner* — John E Breene
*Assistant Examiner* — Jeffrey C Morgan
(74) *Attorney, Agent, or Firm* — Warner Norcross + Judd LLP (57) ABSTRACT

A chlorophyll fluorescence measuring system having at least one spectrometer coupled to a data logger. The data logger provides direct control of the spectrometer and includes on-board memory for storage of target and reference spectrum data obtained by the spectrometer. The data logger may be coupled to an external computer that receives and analyzes target and reference spectrum data to determine SIF using a spectral fitting algorithm. The system may include a spectrometer aiming system coupled to and controlled by the data logger. The system may also include one or more environmental sensors configured to measure environment variables. The environmental sensors may be coupled to the data logger for control and data storage. The environmental data may be communicated to the external computer for use in the spectral fitting algorithm. The data logger may be connected to a network for remote monitoring and control.

12 Claims, 4 Drawing Sheets

(52) U.S. Cl.
CPC . *G01N 2201/0616* (2013.01); *G01N 2201/08* (2013.01); *G01N 2201/13* (2013.01)

(56) References Cited

OTHER PUBLICATIONS

An Automated Comparative Observation System for Sun-Induced Chlorophyll Fluorescence of Vegetation Canopies, Xija Zhou, Zhigang Liu, Shan Xu, Weiwei Zhang and Jun Wu, Sensors 2016, www.mdpi.com/journal/sensors, pp. 1-15, May 27, 2016.
Remote Sensing of Fluorescence, Photosynthesis and Vegetation Status, Abstract Book, ESA-ESRIN, Frascati (Rome), Italy, pp. 1-70 plus cover page, Jan. 17-19, 2017.
Meroni, Michael, et al. The hyperspectral irradiometer, a new instrument for long-term andunattended field spectroscopy measurements, published Apr. 20, 2011, review of scientific Instruments, 82, 043106 (2011), American Institute of Physics.†
Daumard, Fabrice, et al. A Field Platform for Continuous Measurementof Canopy Fluorescence. IEEE Transactions on Geoscience and Remote Sensing, vol. 48, No. 9, p. 3358 et seq, Sep. 2010.†

\* cited by examiner
† cited by third party

SYSTEM AND METHOD FOR MEASURING SUN-INDUCED CHLOROPHYLL FLUORESCENCE

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to systems and methods for measuring sun-induced chlorophyll fluorescence, and more particularly to systems and methods to provide automated measurement of sun-induced chlorophyll fluorescence.

BACKGROUND OF THE INVENTION

The foundation of our biosphere and civilization rests on the food and energy produced by plants using sunlight. Yet currently there is no commercially available technology that can measure, continuously and unattended, plant photosynthesis and physiological stresses in natural environments.

Except for a few organisms that live off the heat and methane from hydrothermal vents at ocean bottoms, all life on Earth depends on photosynthesis by plants under sunlight, not just for food but also for energy, shelter, clothing, and other goods and services. Despite of this importance, our present understanding remains poor with respect to plant photosynthesis and its relationship to growth conditions in natural environments. This poor understanding has direct consequences for a variety of areas ranging from crop management to global carbon cycle modeling. Part of the problem is caused by the lack of appropriate technologies that can conduct continuous and unattended monitoring of plant photosynthesis and physiological stresses in volatile and unpredictable conditions at multiple spatial and temporal scales.

Chlorophyll fluorescence is a dim red and far-red light within the wavelength range of about 650 to 850 nm with two spectral peaks around 690 and 740 nm respectively. This light signal is a signature of photosynthesis because it is emitted directly from inside the core of photosynthetic machinery—chlorophylls within nanoseconds after excitation by photons from a photosynthetically active light source. Its dynamics reflect the physiological and biochemical functioning of the plant precisely at the time when photosynthesis is taking place. It is for this reason that plant scientists have been measuring chlorophyll fluorescence of leaves excited by artificial light (e.g., a lamp with a short-pass filer<650 nm) for decades as a way to probing photosynthesis in laboratory environments.

However, measuring sun-induced chlorophyll fluorescence (SIF) in natural environments is a considerably bigger challenge because the spectrum of SIF overlaps that of reflected solar irradiance which is overall a much stronger (~100 times) signal and therefore it is difficult to disentangle SIF from background interference. This challenge explains why so far there has been no commercially available technology that can conduct continuous and unattended measurements of SIF on plants growing in the field. The recent emergence of high spectral resolution/sensitivity spectrometers makes it possible to take advantage of absorption dark features (Fraunhofer lines, atmospheric oxygen A and B bands) of the solar irradiance spectrum in the chlorophyll fluorescence range to measure SIF. At these dark features, the relative magnitude of SIF over reflected solar irradiance is much enhanced, thus enabling its detection.

Several research groups have been using high-resolution spectrometers and other commercial-off-the-shelf parts to measure SIF over natural vegetation or crops with the Fraunhofer Line Discrimination method. These homemade systems are laborious to use because they require continuous manual supervision via a laptop computer. Consequently most SIF measurements so far have lasted one to several days and operated only in midday conditions. Also other independent measurement systems have to be deployed to measure any additional variables needed to interpret the SIF signal, increasing burdens in both time and cost to researchers. These constraints have limited SIF measurements and applications to a fraction of researchers who are most electronically savvy.

SUMMARY OF THE INVENTION

The present invention provides an automated system for accurately and effectively measuring sun-induced chlorophyll fluorescence ("SIF"). The system generally includes one or more high-resolution, high-sensitivity spectrometers, a data logger, auxiliary sensors for supplementary environmental monitoring (e.g., temperature, humidity, broadband radiation), and a power supply. This system can be expanded with a compact computer and a small monitor for additional capacities, if so desired. The data logger may be configured to directly control and receive data from the spectrometer(s) and auxiliary sensors. It may also be used as a data acquisition/storage device and may be configured to communicate with an external computer, for example, through a direct one-to-one connection or through a public or private network connection (e.g. a local network, a wide area network or the internet). Alternatively, a compact computer can be used onsite to control and receive data from the spectrometer(s) and communicate and coordinate with the data logger which controls and receives data from auxiliary sensors. In this case, external communication can be achieved through the onsite compact computer in addition through the data logger.

In one embodiment, the system includes one or more fiber optic strands (or fiber optic bundles) that introduce solar irradiance and SIF-containing light signals from the outside to the spectrometer(s). The system may include an aiming system for aiming the fiber optic. In one embodiment, the system includes a motor that is capable of alternatively pointing the fiber optic at the target to obtain a target spectrum and at the sky to collect a reference spectrum. The motor may be controlled by the data logger. The motor may be replaced by other automated or manual systems for aiming the fiber optic.

In one embodiment, the system includes two spectrometers arranged to operate in parallel—one for capturing a target spectrum and another for capturing a reference spectrum. In this embodiment, both spectrometers are coupled to the data logger with the target spectrometer including a fiber optic aimed at the target and the reference spectrometer including a fiber optic aimed at the sky. The present invention may be implemented using a wide range of spectrometers, including a variety of commercial available spectrometers, such as the QE Pro Series (e.g. QE Pro-FL) available from Ocean Optics.

In one embodiment, the system includes a supplemental measurement system that is capable of simultaneously measuring environmental variables that might be useful in interpreting obtained SIF signals, such as air temperature, humidity, soil temperature, moisture content, broadband radiation and barometric pressure. In one embodiment, the system includes one or more environmental sensors operatively coupled to the data logger. The data logger may be configured to capture from the environmental sensors measurements of environmental variables simultaneously with the capture of spectrum data. The data logger may be configured to provide operating parameters to one or more of the environmental sensors.

The system may also include additional features intended to provide accurate and consistent measurements of SIF. For example, the system may be housed within a humidity controlled environment. For example, the housing may include a desiccant or other humidity control apparatus. As another example, the housing may include an air conditioning system that is capable of maintaining the electronics within the desired temperature range. For example, the housing may include a thermoelectric air conditioning system.

In one embodiment, the spectrometer integration time is automatically optimized by the data logger according to variations in sky conditions. The data logger may use essentially any algorithm for optimizing integration time. A variety of algorithms for optimizing integration time are well-known to those skilled in the art. For example, the data logger may use an iterative algorithm to optimize integration time.

In one embodiment, the data acquired by the data logger is provided to an outside computer for processing. For example, the spectrum data and any environmental data collected by the system may be uploaded or otherwise transferred to a computer capable of processing the data using spectral fitting algorithms (SFA). The present invention may implement essentially any spectral fitting algorithm that takes into consideration the spectrum data and any desired environmental data. For example, the system may implement the polynomial spectral fitting algorithm, which takes into account the spectrum data, the reference data, and the well-known solar or telluric absorption features. Other examples include the Fraunhofer Line Discrimination (FLD) methods and its variants. It is noted that SFA or FLD data processing can also be done within the data logger if so desired.

In one embodiment, a compact computer (e.g., an industrial fanless computer or Raspberry Pi) is used as an integral part of the FAME package to control and communicate with the spectrometers and/or a motor in a way similar to a data logger for the spectrometers. The compact computer communicates with the data logger which controls and communicates with auxiliary sensors. Data in the data logger are retrieved by the compact computer and processed (e.g., with SFA or FLD).

In one embodiment, the data logger includes a data acquisition functional block, an operation control functional block and a communication functional block. The data acquisition functional block may include the hardware and the control software associated with receiving data from the spectrometer(s) and other sensors, and storing that data. The operation control functional block may include the hardware and the control software associated with directing operation of the spectrometer(s) and other sensors. The communication functional block may include the hardware and software associated with communication with the spectrometer(s), other sensors and an external computer configured to receive data from the data logger. The communication functional block may implement essentially any communication system, including wired and/or wireless communication systems. For example, the data logger may communication with the spectrometer(s) and other sensors by wired connections, such as a serial connection (e.g. RS232) or a USB connection, and may communicate with an external computer via a wireless connection, such as a Bluetooth connection, WiFi connection or NFC connection.

In one embodiment, the system includes an aiming system for directing the fiber optics toward the desired signal source. In one embodiment, the aiming system includes a motor that is selectively controlled by the control system to physically point the input end of the fiber optics toward the target and the reference, such as a location in the sky.

The present invention provides a simple and effective sun-induced chlorophyll Fluorescence Auto-Measurement Equipment (FAME) system that is capable of automatically and continuously measuring sun-induced chlorophyll fluorescence of plants growing in sunlight. The FAME system can be applied at scales of leaf, individual plant, or canopy in the field. Sun-Induced chlorophyll Fluorescence (SIF) is emitted from the core of the photosynthetic machinery of plant and is a vital signal of photosynthesis and physiological stresses. The FAME system allows for unattended, continuous operation and data capture of spectrum data and environmental data relevant to SIF. The FAME system is empowered by a number of hardware and software innovations that make it unprecedented in data quality, acquisition rate, versatility, extensibility, and easiness to operate. It is a high-performance integration of software and hardware technologies. The present invention allows for the production of a truly portable, rugged, and commercially viable instrument for continuous and unattended plant photosynthesis and stress monitoring in the field for scientist and agricultural practitioners. Through hardware and software innovations and system integration, the FAME system removes the constraints of conventional systems so that routine high-quality SIF monitoring is possible for ecological research and agricultural practices.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT EMBODIMENT

Overview.

Figure 1:
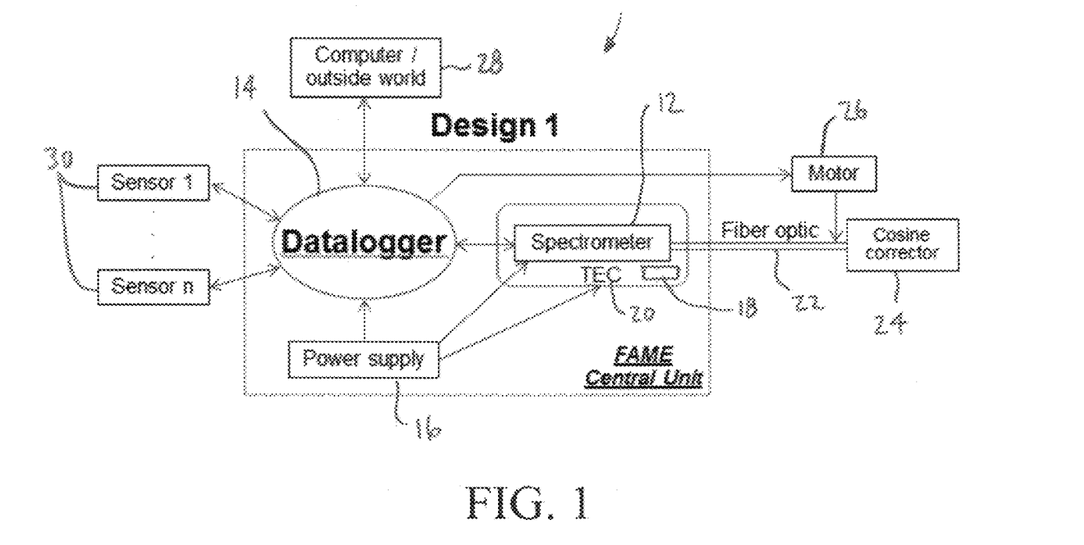
FIG. 1 is a schematic representation of a FAME system in accordance with an embodiment of the present invention.
Figure 2:
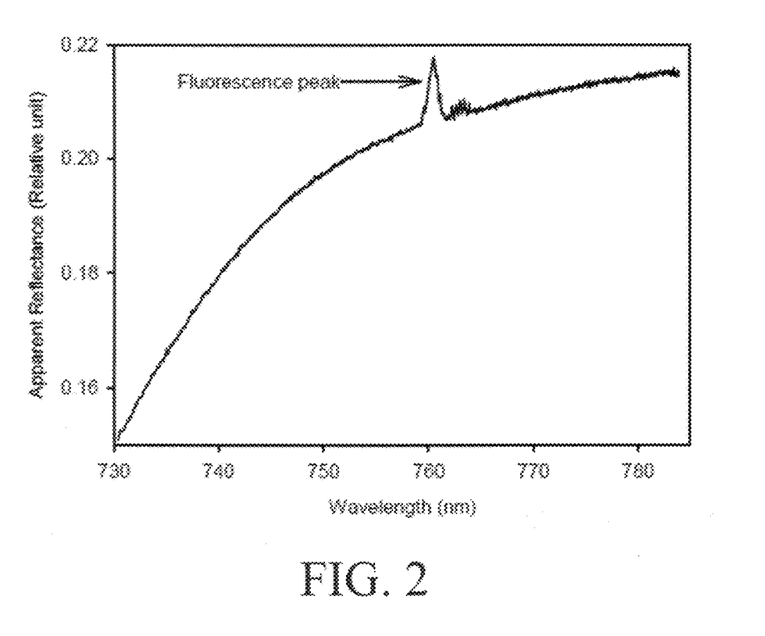
FIG. 2 is a graph of apparent reflectance against wavelength showing a peak caused by SIF.

An embodiment of a sun-induced chlorophyll Fluorescence Auto-Measurement Equipment (FAME) system 10 in accordance with an embodiment of the present invention is shown in FIG. 1. As shown, the FAME system 10 generally includes a spectrometer 12, a data logger 14, a power supply 16, desiccant 18 and an air conditioner 20. In this embodiment, the system 10 includes a fiber optic 22 and cosine corrector 24 that provide input to the spectrometer 12. A motor 26 may be provided to alternately aim the fiber optic 22/cosine corrector 24 at a target and a reference. In this embodiment, the target may be at the scale of a leaf, an individual plant or canopy in the field; and the reference may be a location in the sky. The FAME system 10 may also include one or more additional sensors 30 to measure environmental variables that might be used by the system in determining SIF. In the illustrated embodiment, any desired environmental sensors 30 are coupled to the data logger 14 so that the data logger 14 can receive and store data from the sensors 30. In use, the data logger 14 provides operational parameters to the spectrometer 12 and any other sensors 30, receives and stores spectrum data obtained by the spectrometer 12, receives and stores data collected by any other sensors 30 and communicates the stored data to a separate computer 28 for analysis, such as spectral fitting analysis. Although the system 10 may implement essentially any spectral fitting algorithm, in the illustrated embodiment, the computer 28 determines SIF using the polynomial spectral fitting algorithm, which takes into consideration the target spectrum data, the reference spectrum data and well-known locations of solar and/or telluric absorption lines.

FAME System.

Figure 4:
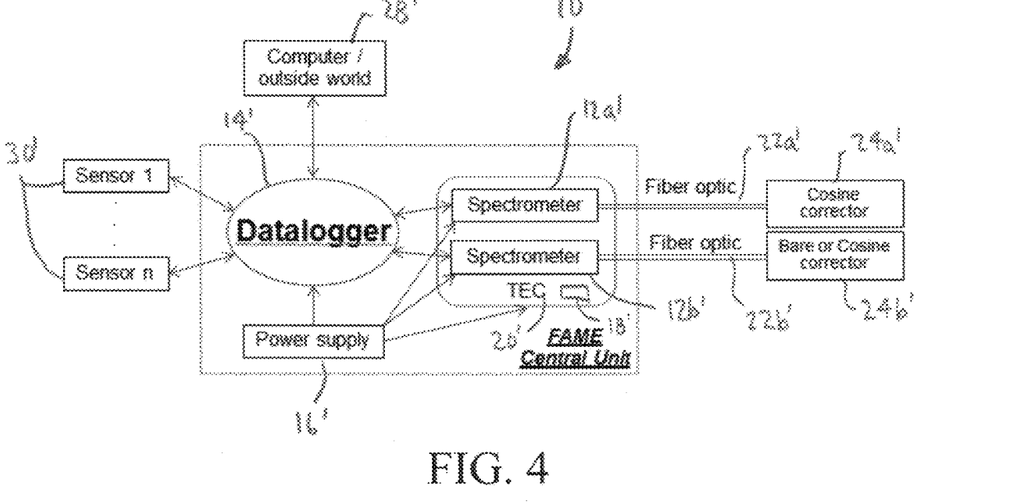
FIG. 4 is a schematic representation of a first alternative embodiment of a FAME system.
Figure 5:
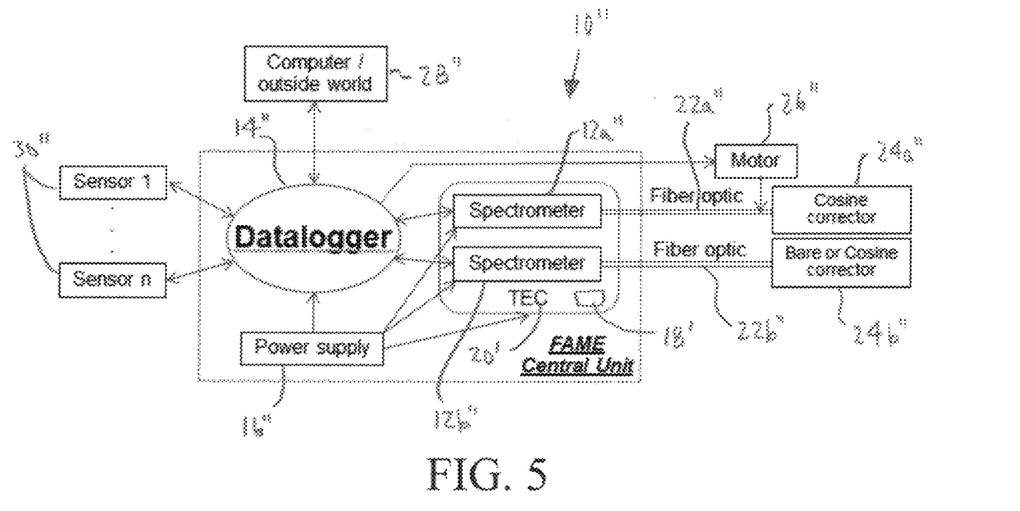
FIG. 5 is a schematic representation of a second alternative embodiment of a FAME system.

The present invention may be implemented using a variety of alternative system architectures. One embodiment of the present invention is shown in FIG. 1. Examples of alternative embodiments are shown in FIGS. 4 and 5. Referring now to the embodiment of FIG. 1, the FAME system 10 generally includes a spectrometer 12, a data logger 14, a power supply 16, a humidity control system 18 (e.g. desiccant) and a temperature control system 20 (e.g. thermoelectric cooling system). The system 10 is configured to obtain spectrum measurements from the target and from a reference (e.g. the sky). In the illustrated embodiment, the system 10 includes a single spectrometer 12 that receives input via a fiber optic 22 (or fiber option bundle). If desired, the collecting end of the fiber optic 22 may be coupled to a cosine corrector 24 or other diffuser that widens the field of view. In the illustrated embodiment, the cosine corrector 24 collects a signal from a 180 degree field of view. To allow collection of spectrum data from both the target and a reference, the system 10 includes a motor 26 that is configured to aim the collecting end of the fiber optic 22. In the illustrated embodiment, the motor 26 is operatively coupled to the data logger 14 so that the data logger 14 can operate the motor 26 to alternatively aim the fiber optic 22 at the target and the reference. The system 10 may also include a number of environmental sensors 30 selected to provide realtime measurements of environmental variables relevant to SIF determination. For example, the system 10 may include environmental sensors 30 to measure air temperature, humidity, soil temperature, moisture content, broadband radiation and barometric pressure. In this embodiment, the environmental sensors 30 are operatively coupled to the data logger 14. For example, depending on the design and configuration of each sensor 30, the sensor 30 may be coupled to the data logger 14 at an analog input or digital input on the data logger 14. As another example, the sensor 30 may be connected to the data logger 14 via a standard communication port (e.g. serial communication port, such as USB or RS232, or parallel communication port). In some applications, the data logger 14 may be configured for wireless communications. If so, the data logger 14 may communicate wirelessly with the spectrometer(s) and/or any environmental sensors 30. The data logger 14 of this embodiment is configured to capture from the environmental sensors 30 measurements of environmental variables simultaneously with the capture of spectrum data. The data logger 14 may also be configured to provide operating parameters to any environmental sensors 30 that are configured to receive operating parameters from an outside source. The system 10 may also include an external computer 28 that is configured to determine SIF using spectral fitting analysis based on the data collected from the spectrometer(s) and relevant environmental sensors 30. For example, an external computer 28 may be coupled to the data logger 14 using a wired or wireless communication link (e.g. LAN, WAN, Bluetooth, WiFi, NFC or Cellular network). The computer 28 may be configured to receive data from the data logger 14 via the wired or wireless connection. The computer 28 may analyze the collected data to determine SIF using any of a wide variety of spectral fitting algorithms.

The present invention may be implemented using essentially any spectrometer or plurality of spectrometers that provide the desired performance specifications, such as fine or ultrafine spectral resolution, as well as adequate spectral sampling interval, stability and signal to noise ratio. In the illustrated embodiment, the system 10 is implemented using a commercial available spectrometer, such as the QE Pro Series (e.g. QE Pro-FL) available from Ocean Optics. In embodiments that include more than one spectrometer, the system may use identical spectrometers so that their measurements correlate. For example, in the embodiments of FIGS. 4 and 5, the spectrometers may both be QE Pro Series spectrometers.

The present invention may be implemented using essentially any suitable data logger. In the illustrated embodiment, the data logger 14 (a.k.a. datalogger or data recorder) may be essentially any data logger capable of communicating with and recording data produced by the spectrometer(s) 12 and any other environmental sensors 30 that might be incorporated into the system. As noted above, the data logger 14 of the illustrated embodiment is connected to an external computer 28 so that the data collected and stored by the data logger 14 can be transferred to the external computer 28 for processing. The computer may include spectral fitting software configured to analyze the spectrum data and any associated environmental data to determine SIF. Given that the system 10 is well-suited for use with conventional spectral fitting algorithms well-known to those skilled in the art, the spectral fitting algorithm will not be described in detail. Suffice it to say that the spectral fitting algorithm uses the reference spectrum to different between ambient/background/environmental light and light generated by sun-induced chlorophyll fluorescence.

In the illustrated embodiment, the data logger 14 is configured to directly communicate operating parameters to the spectrometer 12 and to record spectrum data provided by the spectrometer 12. In applications that incorporate other environmental sensors 30, the data logger 14 may be configured to provide operating parameters to the environmental sensors 30 and to record the measurement taken by the environmental sensors 30. Although the present invention may be implemented using a wide range of data loggers 14, including a variety of commercially available data loggers, the CR1000 or CR6 data logger available from Campbell Scientific is used in implementing the embodiments shown in FIGS. 1, 4 and 5.

In the illustrated embodiment, the data logger generally includes a processor, one or more communication ports, a plurality of analog and digital inputs and a memory for storing data received from the spectrometer(s) and other external sensors. The communication port(s) (not shown) may be essentially any communication port capable of exchanging communications with other system components, such as a serial communication port, a parallel communication port, Ethernet or a USB port. The data logger may be coupled to the spectrometer and may be programmed to communicate operating parameters to the spectrometer. For example, the data logger may communicate to the spectrometer(s) certain operating parameters, such as CCD Integration time, CCD temperature, internal shutter control, radiance/irradiance calibration coefficients, wavelength calibration coefficients, serial port communication settings, buffer holding capacity, buffer clearing and data retrieval parameters. In the embodiment of FIG. 1, the data logger 14 is a standalone device in the sense that its collects and stores data on its own without intervention or interaction with the external computer. In alternative embodiments, the data logger 14 may record its data directly in the memory of the computer 28. For example, the data logger 14 may be operated using software that allows the data logger 14 to write to the memory of the computer 28, or the computer 28 may by operated using software that allows it to extract data from the data logger 14.

As noted above, the system 10 includes a motor 26 that is attached to the fiber optic 22 or the cosine corrector 24. In this embodiment, the motor 26 is an electric motor that is coupled to the fiber optic 22/cosine corrector 24 by a linkage (not shown) that translates rotation of the motor 26 into the movement needed to alternatively aim between the target and the reference. In this embodiment, the data logger 14 is configured to operate the motor 26, but it should be understood that the motor 26 may be controlled by a separate controller, including an integrated motor controller. The motor 26 may be replaced by essentially any mechanism capable of aiming the fiber optic 22/cosine corrector 24. For example, the motor 26 may be replaced by a solenoid or linear actuator that provides the desired motion.

In the illustrated embodiment, the various electrically powered components of the system receive power from the power supply 16. The power supply 16 may be an electrical energy storage device, such as a battery, a bank of batteries, a rechargeable battery or a bank of rechargeable batteries, or the power supply 16 may be coupled to an external supply of power, such as mains power, via a wired or wireless connection. Although referred to in the singular, it should be understood that the power supply 16 may include a plurality of separate power supplies. In use, the power supply 16 may supply power to the spectrometer 12, data logger 14, the humidity control system 18 (if powered) and the temperature control system 20.

The operation of the system 10 can be monitored and controlled remotely. For example, the system 10 may be connected to a private network or to a public network (e.g. the Internet) to allow access to the computer 28 and/or the data logger 14 from a remote location. In use, a user may, for example, remotely set the operating parameters of the system 10 and/or remotely retrieve data collected by the data logger 14.

In the illustrated embodiment, the FAME system 10 is configured to determine SIF based on a target spectrum, a reference spectrum and any desired environmental variables. The external computer 28 may be essentially any computer capable of obtaining and analyzing data stored on the data logger 14. The computer 28 and data logger 14 may be coupled to one another using a bidirectional communication connection. In one embodiment, the external computer 28 is a conventional personal computer running software configured to interact with the data logger 14 via a conventional serial connection, such as a USB connection or an RS232 connection. Alternatively, the computer 28 and data logger 14 may be connected using a wireless communication system, such as Bluetooth, WiFi or NFC. The software may allow a user to adjust essentially all aspects of operation of the data logger 14 and all hardware coupled to the data logger 14. For example, the software may provide an interface that allows adjustment of the operating parameters of the data logger 14, the operating parameters of the spectrometer(s) 12 and/or the operating parameters of any environmental sensors 30. The spectral fitting algorithm may take into consider target spectrum data, reference spectrum data and data collected from the environmental sensors to isolate and characterize SIF the target spectrum.

Prior to operation, the spectrometer(s) 12 may undergo absolute irradiance calibration. This calibration may be conducted online.

As noted above, the present invention may be implemented in a variety of alternative system architectures. An alternative embodiment of the present invention is shown in FIG. 4. In this embodiment, the system 10' includes two spectrometers so that target and reference spectrum may be captured simultaneously without the need to alternately aim a single fiber optic between the target and the reference. The system 10' of FIG. 4 generally includes a target spectrometer 12a', a reference spectrometer 12b', a data logger 14', a power supply 16', a humidity control system 18' (e.g. desiccant) and a temperature control system 20' (e.g. thermoelectric cooling system). In the illustrated embodiment, the target spectrometer 12a' receives input via a target fiber optic 22a', which may be fitted with a cosine corrector 24a' or other diffuser. Similarly, the reference spectrometer 12b' receives input via a reference fiber optic 22b', which may be bare of may be fitted with a cosine corrector 24b' or other diffuser. In the illustrated embodiment, the two spectrometers 12a'-b' are operatively coupled to the data logger 14 so that the data logger 14 can provide operational parameters to and receive spectrum data from the spectrometers 12a'-b'. The system 10' may also include a number of environmental sensors 30' selected to provide realtime measurements of environmental variables relevant to SIF determination. In this embodiment, the environmental sensors 30' are operatively coupled to the data logger 14'. The system 10' also includes an external computer 28' that is configured to determine SIF using spectral fitting analysis based on the data collected from the spectrometer(s) 12a'-b' and relevant environmental sensors 30'. The external computer 28' may be coupled to the data logger 14' using a wired or wireless connection. The computer 28' may be configured to receive data from the data logger 14' via the wired or wireless connection. The computer 28' may analyze the collected data to determine SIF using any of a wide variety of spectral fitting algorithms.

Another alternative embodiment of the present invention is shown in FIG. 5. In this embodiment, the system 10" generally includes two spectrometers so that two spectra may be captured simultaneously. Further, one of the two spectrometers may include an aiming system to allow the fiber optic to be aimed, thereby allowing the associated spectrometer to obtained data from essentially any number of different fields of view, such as a different targets and/or different references. The system 10" of FIG. 5 generally includes a first spectrometer 12a", a second spectrometer 12b", a data logger 14", a power supply 16", a humidity control system 18" and a temperature control system 20". In this embodiment, the first spectrometer 12a" receives input via a first fiber optic 22a", which may be fitted with a cosine corrector 24a" or other diffuser. Similarly, the second spectrometer 12b" receives input via a second fiber optic 22b", which may be bare of may be fitted with a cosine corrector 24b" or other diffuser. In the illustrated embodiment, the two spectrometers 12a"-b" are operatively coupled to the data logger 14" so that the data logger 14" can provide operational parameters to and receive spectrum data from the spectrometers 12a"-b". For example, the first spectrometer 12a" may be used to collect target data and the second spectrometer 12b" may be used to collect reference data. The system 10" also include an aiming system for changing the field of view of the first spectrometer 12a". In this embodiment, the aiming system includes a motor 26" that is attached to the fiber optic 22a" or the cosine corrector 24a". In this embodiment, the motor 26" is an electric motor that is coupled to the fiber optic 22a"/cosine corrector 24a" by a linkage (not shown) that translates rotation of the motor 26" into the movement needed to change the field of view of the spectrometer 12a". In this embodiment, the data logger 14" is configured to operate the motor 26", but it should be understood that the motor 26" may be controlled by a separate controller, including an integrated motor controller. The motor 26" may be replaced by essentially any mechanism capable of aiming the fiber optic 22a"/cosine corrector 24a". The system 10" may also include a number of environmental sensors 30" selected to provide realtime measurements of environmental variables relevant to SIF determination. In this embodiment, the environmental sensors 30" are operatively coupled to the data logger 14". The system 10" also includes an external computer 28" that is configured to determine SIF using spectral fitting analysis based on the data collected from the spectrometer(s) 12a"-b" and relevant environmental sensors 30". The external computer 28" may be coupled to the data logger 14" using a wired or wireless connection. The computer 28" may be configured to receive data from the data logger 14" via the wired or wireless connection. The computer 28" may analyze the collected data to determine SIF using any of a wide variety of spectral fitting algorithms.

Figure 6:
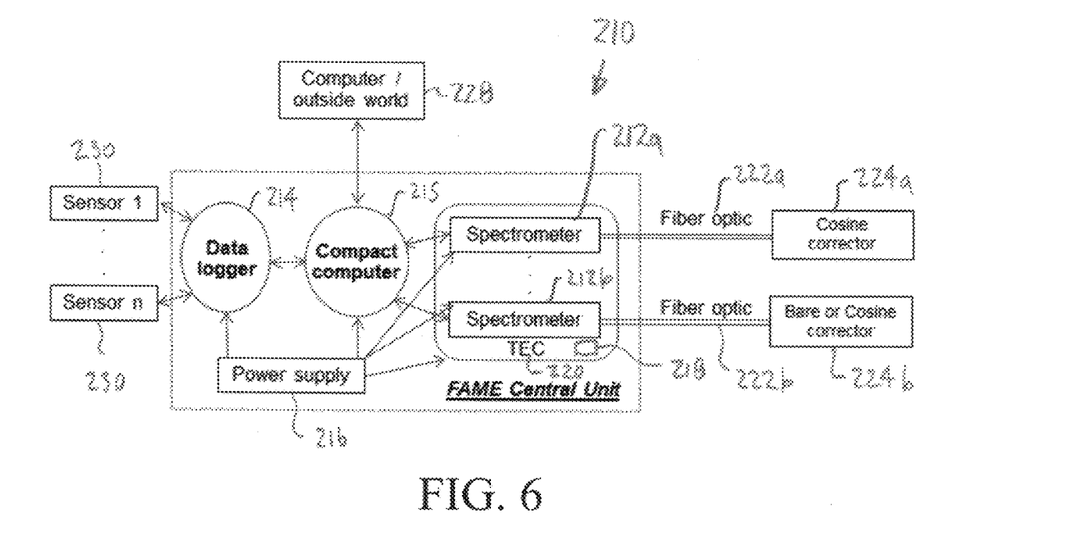
FIG. 6 is a schematic representation of a third alternative embodiment of a FAME system.
Figure 7:
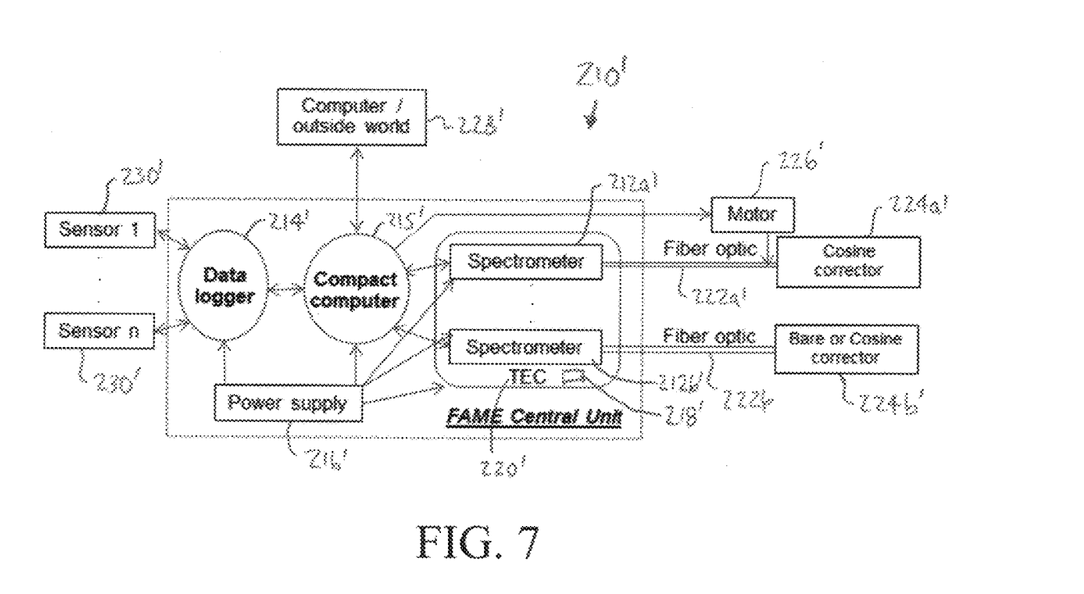
FIG. 7 is a schematic representation of a fourth alternative embodiment of a FAME system.

In the embodiments shown in FIGS. 1, 4 and 5, the data logger 14, 14' and 14" is connected directly to the spectrometer(s) 12, 12a-b' and 12a-b". In other embodiments, a compact computer (e.g., an industrial fanless computer, Raspberry Pi or other similar single-board computer) is used as an integral part of the FAME system 10. 10' and 10" to control and communicate with the spectrometers and/or a motor, for example, in a way similar to a data logger for the spectrometers. FIGS. 6 and 7 show two alternative embodiments of the present invention that incorporate a compact computer. In both of these embodiments, the compact computer 215, 215' communicates with the data logger 214, 214' and with the spectrometers 212a-b, 212a-b', and the data logger 214, 214' controls and communicates with auxiliary sensors 230, 230'. Data in the data logger 214, 214' are retrieved by the compact computer 215, 215' and processed (e.g., with SFA or FLD).

Referring now to FIG. 6, the FAME system 210 generally includes a target spectrometer 212a, a reference spectrometer 212b, a data logger 214, a compact computer 215, a power supply 216, a humidity control system 218 (e.g. desiccant) and a temperature control system 220 (e.g. thermoelectric cooling system). In the illustrated embodiment, the target spectrometer 212a receives input via a target fiber optic 222a, which may be fitted with a cosine corrector 224a or other diffuser. Similarly, the reference spectrometer 212b receives input via a reference fiber optic 222b, which may be bare of may be fitted with a cosine corrector 224b or other diffuser. In the illustrated embodiment, the two spectrometers 212a-b are operatively coupled to the compact computer 215 so that the compact computer 215 can provide operational parameters to and receive spectrum data from the spectrometers 212a-b. The compact computer 215 may pass the spectrum data from the spectrometers 212a-b to the data logger 214. The system 210 may also include a number of environmental sensors 230 selected to provide realtime measurements of environmental variables relevant to SIF determination. In this embodiment, the environmental sensors 230 are operatively coupled to the data logger 214. The system 210 may also includes an external computer 228. The external computer 228 and/or the compact computer 215 may be configured to determine SIF using spectral fitting analysis based on the data collected from the spectrometer(s) 212a-b and relevant environmental sensors 230. The external computer 228 and/or the compact computer 215 may analyze the collected data to determine SIF using any of a wide variety of spectral fitting algorithms. The external computer 228 may be coupled to the compact computer 215 using a wired or wireless connection. The external computer 228 may be configured to receive data from the compact computer 215 via the wired or wireless connection. It may additionally or alternatively be configured to control operation of the compact computer 215, data logger 214, spectrometers 212a-b and other system components.

The embodiment of FIG. 7 is similar to that of FIG. 5, except that it includes a compact computer. The system 210' of FIG. 7 generally includes a first spectrometer 212a', a second spectrometer 212b', a data logger 214', a compact computer 215', a power supply 216', a humidity control system 218' and a temperature control system 220'. In this embodiment, the first spectrometer 212a' receives input via a first fiber optic 222a', which may be fitted with a cosine corrector 224a' or other diffuser. Similarly, the second spectrometer 212b' receives input via a second fiber optic 222b', which may be bare of may be fitted with a cosine corrector 224b' or other diffuser. In the illustrated embodiment, the two spectrometers 212a-b' are operatively coupled to the compact computer 215' so that the compact computer 215' can provide operational parameters to and receive spectrum data from the spectrometers 212a-b'. In use, the spectrum data may be passed by the compact computer 215' to the data logger 214' for storage. For example, the first spectrometer 212a' may be used to collect target data and the second spectrometer 212b' may be used to collect reference data. The system 210' also include an aiming system for changing the field of view of the first spectrometer 212a'. In this embodiment, the aiming system includes a motor 226' that is coupled to the fiber optic 222a'/cosine corrector 224a' by a linkage (not shown) that translates rotation of the motor 226' into the movement needed to change the field of view of the spectrometer 212a'. In this embodiment, the compact computer 215' is configured to operate the motor 226', but it should be understood that the motor 226' may be controlled by the data logger 214' or a separate controller, including an integrated motor controller. The motor 226' may be replaced by essentially any mechanism capable of aiming the fiber optic 222a'/cosine corrector 224a'. The system 210' may also include a number of environmental sensors 230' selected to provide realtime measurements of environmental variables relevant to SIF determination. In this embodiment, the environmental sensors 230' are operatively coupled to the data logger 214'. The system 210' also includes an external computer 228' that is coupled to the compact computer 215'. The compact computer 215' and/or external computer 228' may be configured to determine SIF using spectral fitting analysis based on the data collected from the spectrometer(s) 212a-b' and relevant environmental sensors 230'. The external computer 228' may be coupled to the compact computer 215' using a wired or wireless connection. In alternative embodiments, the external computer 228' may additionally or alternatively coupled to the data logger 214'. The external computer 228" may be configured to receive data from the compact computer 215' and/or data logger 214' via the wired or wireless connection.

The present invention also provides a method of determining sun-induced chlorophyll fluorescence of a target. The target may be essentially any plant or group of plants that undergo photosynthesis, and may be measured at essentially any scale from the scale of a single leaf, to the scale of an individual plant to the scale of group of plants, such as an entire canopy. The method of one embodiment shown in FIG. 3 includes the general steps of: (a) providing a data logger and at least one spectrometer; (b) communicating or otherwise providing spectrometer operating parameters from the data logger to the spectrometer 102; (c) aiming the spectrometer at the reference (e.g. the sky) 104, (d) capturing reference spectrum data from the reference using the spectrometer 106; (e) storing reference spectrum data in memory on board the data logger 108; (f) aiming the spectrometer at the target 110; (g) capturing target spectrum data from the target using the spectrometer 112; (h) storing target spectrum data in memory on board the data logger 114; (i) transferring the target spectrum data and the reference spectrum data to a computer separate from the data logger 116; and (j) analyzing on the computer the target spectrum data and the reference spectrum data using a spectral fitting algorithm to determine sun-induced chlorophyll fluorescence of the target 118.

Figure 3:
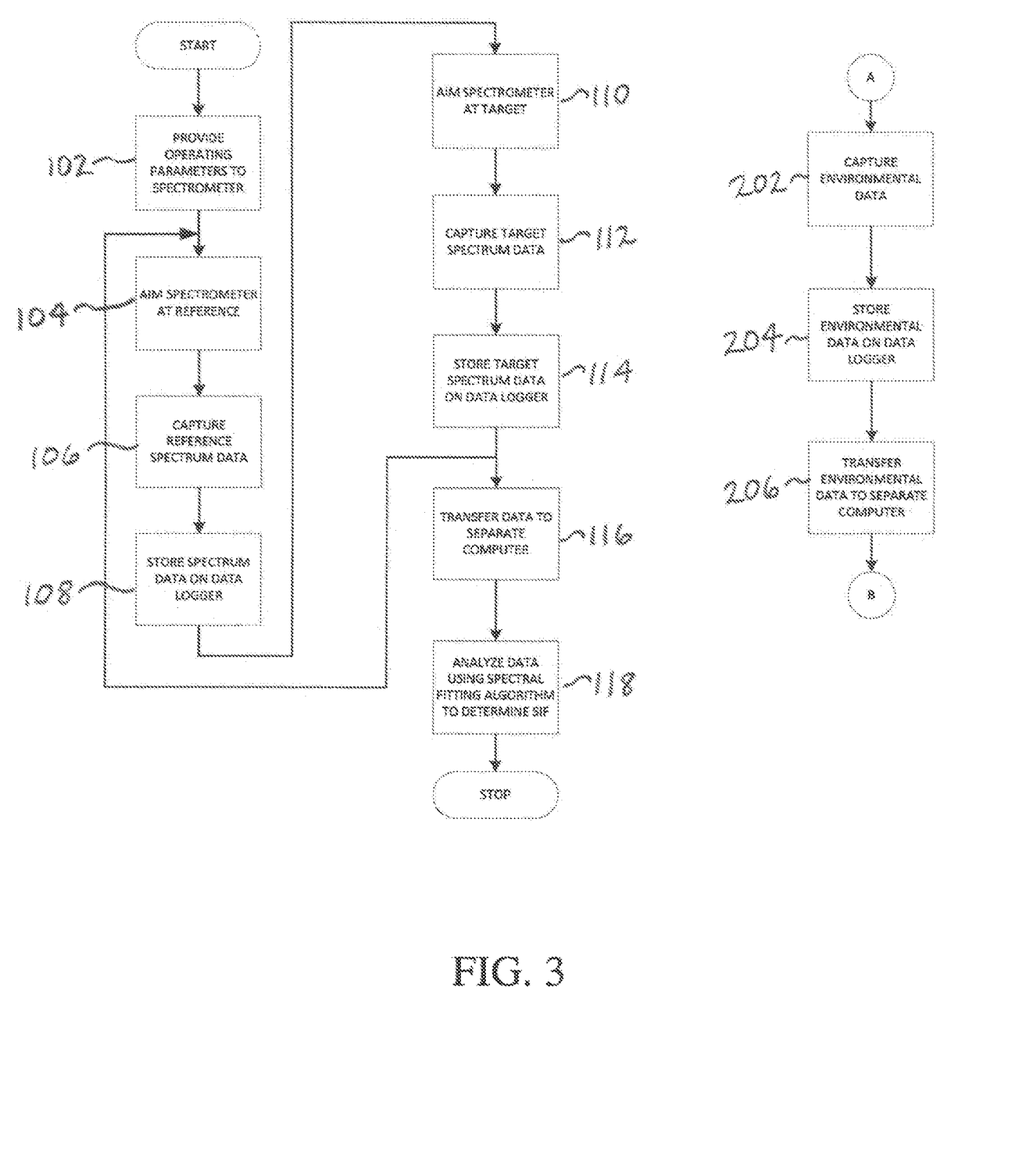
FIG. 3 is a flow chart showing the general steps of a method for measuring SIF using a FAME system according to an embodiment of the present invention.

In applications that the use of incorporate environmental variables, the method may include the additional steps of: (a) providing at least one environmental sensor configured to capture environmental variables; (b) operatively coupling the at least one environmental sensor to the data logger; (b) capturing environmental data using the at least one environmental sensor 202; (c) storing the environmental data on the data logger 204; and (d) communicating the stored environmental data to the computer so that it can be used in performing spectral analysis 206. These steps may occur simultaneously, substantially simultaneously or in series with the collection and storage of spectrum data. For example, the system 10 may be configured to obtain environmental data simultaneously with the steps of capturing reference spectrum data and/or target spectrum data to ensure improved correlation between the spectrum data and the environmental data. In this embodiment, the analyzing step is further defined as analyzing on the computer the target spectrum data, the reference spectrum data and the environmental data using a spectral fitting algorithm to determine sun-induced chlorophyll fluorescence of the target.

In an alternative embodiment that incorporates the use of two spectrometers, the method may be modified to take advantage of the second spectrometer. For example, the method may include the general steps of: (a) providing a data logger, a reference spectrometer and a target spectrometer; (b) communicating spectrometer operating parameters from the data logger to the reference spectrometer; (c) communicating spectrometer operating parameters from the data logger to the target spectrometer; (d) capturing reference spectrum data from the reference using the reference spectrometer; (e) storing reference spectrum data in memory on board the data logger; (f) capturing target spectrum data from the target using the target spectrometer; (g) storing target spectrum data in memory on board the data logger; (h) transferring the target spectrum data and the reference spectrum data to a computer separate from the data logger; and (i) analyzing on the computer the target spectrum data and the reference spectrum data using a spectral fitting algorithm to determine sun-induced chlorophyll fluorescence of the target. In this embodiment, the reference spectrum data and the target spectrum data may be captured simultaneously or substantially simultaneously, if desired. In applications where it is desirable to incorporate environmental variables into the spectral fitting algorithm, the method may include the additional steps associated with the capture and use of environmental data described above.

In another alternative embodiment, the system may include at least two spectrometers and at least one of the spectrometers may include an aiming system to allow that spectrometer to collect spectrum data from at least two different fields of view. In this alternative embodiment, the method may include the additional step of aiming the spectrometer with the aiming system at the desired field of view before each capture. In this embodiment, the two spectrometers may be operated to capture spectrum data simultaneously or substantially simultaneously, if desired. In applications where it is desirable to incorporate environmental variables into the spectral fitting algorithm, the method may include the additional steps associated with the capture and use of environmental data described above.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A chlorophyll fluorescence measuring system comprising:
   a spectrometer having a plurality of operating parameters and configured to capture spectrum data;
   a single optical fiber operatively associated with an input to said spectrometer;
   at least one environmental sensor configured to measure at least one environmental variable relevant to chlorophyll fluorescence;
   a data logger coupled to said spectrometer and said at least one environmental sensor, said data logger having a communication system for simultaneously receiving spectrum data from said spectrometer and environmental data from said at least one environmental sensor, said data logger having a memory for storing spectrum data received from said spectrometer and said environmental data from said at least one environmental sensor;
   a spectral fitting computer separate from said data logger, said computer having a communication system configured to provide communications with said data logger, said computer having a spectral fitting module configured to analyze data obtained from said data logger to determine sun-induced chlorophyll fluorescence of a target; and
   an aiming system to alternately aim said single optical fiber at the target and at a skyward location as a reference, wherein said spectrometer is capable of capturing target spectrum data from the target and reference spectrum data from the reference.

2. The system of claim 1 wherein said data logger communication system is configured to allow said data logger to communicate said plurality of operating parameters to said spectrometer.

3. The system of claim 1 wherein said spectral fitting computer is configured to analyze said target spectrum data, said reference spectrum data and said at least one environmental variable data obtained from said data logger to determine sun-induced chlorophyll fluorescence of the target.

4. A system for measuring sun-induced chlorophyll fluorescence of a target comprising:
   a spectrometer having a plurality of operating parameters and configured to capture target spectrum data;
   an optical fiber operatively associated with an input to said spectrometer;
   at least one environmental sensor configured to measure at least one environmental variable relevant to chlorophyll fluorescence;
   a data logger coupled to said spectrometer and said at least one environmental sensor, said data logger having a communication system for communicating said operating parameters to said spectrometer, said communication system configured to simultaneously receive spectrum data from said spectrometer and environmental data from said at least one environmental sensor, said data logger having a memory for storing said spectrum data and said environmental data;
   an aiming system to alternately aim said optical fiber at a target and at a skyward location as a reference, wherein said spectrometer is capable of capturing target spectrum data from the target and reference spectrum data from the reference; and
   a spectral fitting computer separate from said data logger, said computer having a communication system configured to communication with said data logger, said computer having a spectral fitting module configured to analyze data obtained from said data logger to determine sun-induced chlorophyll fluorescence of the target, said data including said reference spectrum data and said target spectrum data.

5. The system of claim 4 wherein said spectral fitting module is configured to analyze said target spectrum data, said reference spectrum data and said environmental variable data obtained from said data logger to determine sun-induced chlorophyll fluorescence of the target.

6. The system of claim 4 wherein said spectrometer is disposed within a housing having a cooling system and a humidity control system.

7. The system of claim 6 wherein said cooling system includes thermoelectric cooling system.

8. A method for determining sun-induced chlorophyll fluorescence of a target, comprising the steps of:
   providing a data logger and a spectrometer;
   communicating spectrometer operating parameters to the spectrometer;
   alternately aiming a single optical fiber at a target and at a skyward location to capture target spectrum data and reference spectrum data for output to the spectrometer;
   storing the reference spectrum data and the target spectrum data in memory on board the data logger;
   measuring at least one environmental variable relevant to chlorophyll fluorescence;
   receiving, at the data logger, the environmental data simultaneously with at least one of the target spectrum data and the reference spectrum data;
   transferring the target spectrum data and the reference spectrum data, and the environmental data to a computer separate from the data logger; and
   analyzing on the computer the target spectrum data, the reference spectrum data, and the environmental data using a spectral fitting algorithm to determine sun-induced chlorophyll fluorescence of the target.

9. The method of claim 8 wherein alternately aiming the optical fiber at the target and at the skyward location includes the steps of:
   aiming the optical fiber at a first field of view with an aiming system; and aiming the optical fiber at a second field of view with the aiming system.

10. The method of claim 8 wherein said analyzing step is further defined as analyzing on the computer the target spectrum data, the reference spectrum data and the environmental data using a spectral fitting algorithm to determine sun-induced chlorophyll fluorescence of the target.

11. The method of claim 10 wherein the environmental sensor is configured to measure at least one of air temperature, humidity, soil temperature, moisture content, broadband radiation and barometric pressure.

12. The method of claim 8 wherein the data logger is connected to a network; and further including the step of remotely controlling the data logger via the network connection.

\* \* \* \* \*